(12) United States Patent  (10) Patent No.: US 8,345,876 B1
Sinn et al.  (45) Date of Patent: Jan. 1, 2013

(54) ENCRYPTION/DECRYPTION SYSTEM AND METHOD

(76) Inventors: Robert Samuel Sinn, St. Julians (MT); Charles Gordon Sinn, Delray Beach, FL (US); Robert Mannerstedt Sinn, Delray Beach, FL (US)

( * ) Notice: Subject to any disclaimer, the term of this patent is extended or adjusted under 35 U.S.C. 154(b) by 0 days.

(21) Appl. No.: 13/413,603

(22) Filed: Mar. 6, 2012

(51) Int. Cl.
*H04L 9/00* (2006.01)

(52) U.S. Cl. ............ 380/255; 380/46; 380/45; 380/44; 713/189; 713/150; 726/2; 726/3; 726/4; 726/6

(58) Field of Classification Search ................ None
See application file for complete search history.

(56) References Cited

U.S. PATENT DOCUMENTS

| | | | |
|---|---|---|---|
| 5,220,606 A | | 6/1993 | Greenberg |
| 5,335,280 A | * | 8/1994 | Vobach ............ 380/42 |
| 5,345,507 A | | 9/1994 | Herzberg et al. |
| 5,363,448 A | | 11/1994 | Koopman, Jr. et al. |
| 6,026,165 A | | 2/2000 | Marino et al. |
| 6,049,612 A | | 4/2000 | Fielder et al. |
| 6,363,152 B1 | * | 3/2002 | Cornelius et al. ........ 380/255 |
| 6,728,376 B1 | * | 4/2004 | Dean et al. ............ 380/54 |
| 6,868,495 B1 | * | 3/2005 | Glover .............. 713/190 |
| 7,248,699 B2 | * | 7/2007 | Yochim ............. 380/268 |
| 7,346,160 B2 | * | 3/2008 | Michaelsen ........... 380/28 |
| 7,506,161 B2 | | 3/2009 | Mizrah |
| 2002/0131592 A1 | | 9/2002 | Hinnant |
| 2003/0112972 A1 | * | 6/2003 | Hattick et al. .......... 380/46 |
| 2006/0126833 A1 | | 6/2006 | O'Leary et al. |
| 2006/0171534 A1 | * | 8/2006 | Baughman .......... 380/47 |
| 2007/0064946 A1 | | 3/2007 | Ohkubo et al. |
| 2008/0025505 A1 | | 1/2008 | Yochim |
| 2008/0137868 A1 | | 6/2008 | Sanders et al. |
| 2009/0245516 A1 | | 10/2009 | Ravikiran |
| 2009/0254572 A1 | * | 10/2009 | Redlich et al. ......... 707/10 |
| 2009/0323938 A1 | | 12/2009 | Schneider |
| 2010/0027796 A1 | | 2/2010 | Robert |
| 2010/0166181 A1 | | 7/2010 | Leech |
| 2010/0250497 A1 | * | 9/2010 | Redlich et al. ........ 707/661 |
| 2010/0284533 A1 | | 11/2010 | Kameda et al. |
| 2011/0072321 A1 | * | 3/2011 | Dhuse .............. 714/55 |
| 2011/0099591 A1 | * | 4/2011 | Long et al. .......... 725/81 |
| 2011/0161680 A1 | * | 6/2011 | Grube et al. ......... 713/193 |
| 2012/0131335 A1 | * | 5/2012 | Bailey et al. ........ 713/164 |
| 2012/0134494 A1 | * | 5/2012 | Liu ............... 380/44 |
| 2012/0198241 A1 | * | 8/2012 | O'Hare et al. ........ 713/189 |

FOREIGN PATENT DOCUMENTS

WO  2010086855 A2  8/2010

* cited by examiner

*Primary Examiner* — Syed A. Zia

(74) *Attorney, Agent, or Firm* — Panitch Schwarze Belisario & Nadel LLP

(57) ABSTRACT

A method of encrypting a plain text message that is m characters in length is described. A one off random key having a length of m characters is generated. The random key uses a character set and modulus that is compatible with the plain text message. A first substitution encryption of the plain text message is performed using the generated random key. A string of random fill characters that is f characters in length, f being a number between zero and infinity is generated. The generated random key and the string of random fill characters is concatenated to the encrypted plain text message to generate an encrypted message string. The encrypted message string has a length 2m+f. The encrypted message string is transmitted to a receiver.

16 Claims, 16 Drawing Sheets

ENCRYPTION/DECRYPTION SYSTEM AND METHOD

BACKGROUND OF THE INVENTION

Embodiments of the present invention relate generally to encryption and decryption methods systems. More particularly, embodiments of the present invention are directed to methods and systems for encrypting a plain text message by performing one or more encryption operations on the plain text message, wherein at least one of the encryption operations uses a one off random key.

Encryption systems utilizing one-off random keys are well known in the art. If used correctly, messages encrypted with a truly random key are impossible to crack. One implementation of an encryption system utilizing one off random keys is the one-time pad system. One-time pads are matching pairs of pads, with each pad having multiple pages of random sequences of characters printed or written thereon. Matching pads have matching random sequences of characters so that when an encrypting party uses a random sequence of characters on a pad to encrypt the message, the receiving party has to use the matching random sequence of characters in their pad to decrypt the message.

This type of encryption system suffers from several drawbacks. First, use of one-time pads must be synchronized so that both the sending and receiving party use a matching page of a matching pad set. If either the pad or the page of the pad does not match, the receiving party will not be able to decrypt the message or may decrypt a message that is different from the original message. Second, use of such one time pads suffers from the possibility of the pads being intercepted or copied since they have to be transmitted separately from the encrypted message itself.

Accordingly, it is desirable to improve the functionality of encryption systems utilizing a one off random key by transmitting the one off random key together with the encrypted message.

BRIEF SUMMARY OF THE INVENTION

In one embodiment, a method of encrypting a plain text message that is m characters in length is described. A one off random key having a length of m characters is generated. The random key uses a character set and modulus that is compatible with the plain text message. A first substitution encryption of the plain text message is performed using the generated random key. A string of random fill characters that is f characters in length, f being a number between zero and infinity is generated. The generated random key and the string of random fill characters is concatenated to the encrypted plain text message to generate an encrypted message string. The encrypted message string has a length 2m+f. The encrypted message string is transmitted to a receiver.

In another embodiment, a method of encrypting a plain text message that is m characters in length, including any end of message characters, is described. A setting of two or more parameters is received. The parameters include a block size b and a plain text segment size p. The value of b is equal to or greater than 2*p. The plain text message is divided into n segments, each of the blocks containing a sequential segment of the plain text message. Each segment is associated with one of n blocks, n being equal to m/p if there is no remainder and equal to the integer quotient+1 if there is a remainder r. Where there is a remainder, the last block of the n blocks contains the last r characters of the m character message. For each of the n blocks, one-off strings of random characters are generated using a character set and modulus that is compatible with the plain text message. A first substitution encryption is performed on each of the n segments using characters from the random string associated with the block associated with the respective segment as an encryption key. An encrypted message string is generated by concatenating the encrypted character strings of the n blocks such that the encrypted message string is at least 2m characters in length. The encrypted message string is transmitted to a receiver.

In yet another embodiment, a method of encrypting a plain text message that is m characters in length, including any end of message characters is described. The plain text message is divided into n segments. Each segment is associated with one of n blocks. One off random strings are generated for each of the n blocks. Each random string has a length of at least the length of the plain text segment associated with that block. Each of the random strings use a character set and modulus that is compatible with the plain text message. A first substitution encryption is performed on each of the n plain text segments using characters from the random string associated with the block associated with the respective plain text segment as an encryption key. An encrypted message string is generated by concatenating the encrypted character strings of the n blocks such that the encrypted message string is at least 2m characters in length. The encrypted message string is transmitted to a receiver.

In yet another embodiment, an encryption system comprising an algorithm and a plurality of parameter sets is described. The encryption system produces an encrypted message using one of the plurality of parameter sets. The encrypted message contains all of the information needed to decrypt the encrypted message by a decryption system having the same parameter set. The probability of subsequent encryptions of the same plain text message producing a different encrypted message depends on the parameter set used by the encryption system.

In yet another embodiment, an encryption method is described. A plain text message is received. The plain text message is segmented into a plurality of blocks. A unique one off random key is generated for each of the plurality of blocks. Each of the plurality of blocks is encrypted using the corresponding one off random key. One or more additional encryptions are performed on each of the blocks using pseudorandom strings.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 11 is a cipher text decimal message generated by the exemplary encryption/decryption application of FIG. 10a, showing an encrypted message string generated by a first encryption of the plain text message input in FIG. 10b;

FIG. 13 is an exemplary global settings screen of the encryption/decryption application of FIG. 10a;

FIG. 14 is an exemplary routine settings screen of the encryption/decryption application of FIG. 10a;

FIG. 15a is an exemplary algorithm settings screen of the encryption/decryption application of FIG. 10a; and FIG. 15b is an exemplary algorithm addition screen of the encryption/decryption application of FIG. 10a.

DETAILED DESCRIPTION OF THE INVENTION

Figure 1:
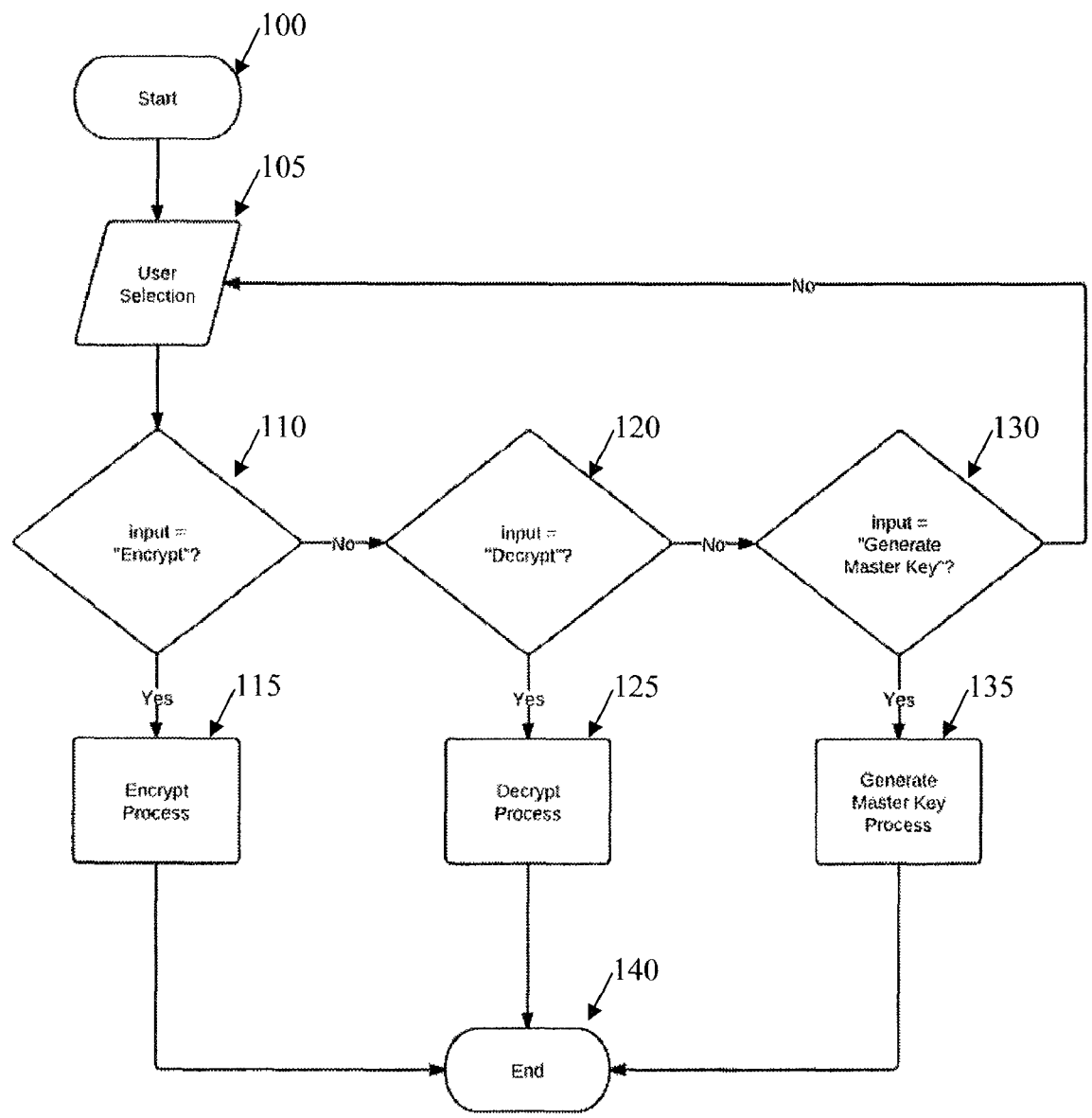
FIG. 1 is a flowchart of a selection process for an encryption/decryption process in accordance with a preferred embodiment of this invention.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

It is well known that plain text encrypted with a one off random key is impossible to decrypt without knowledge of the one off random key. In order to facilitate such a random key encryption and to protect the one off random key from detection by unauthorized parties, the one off random key is included in an encrypted message by performing subsequent steps, such as one or more substitution and/or transposition encryptions. This process makes it substantially impossible to identify the one off random key without prior knowledge of the algorithm necessary to identify it.

Preferably, a new random key is generated each time an encryption is performed. Due to the random key being different, each plain text message produces a completely different encrypted string each time it is encrypted. This is true even for multiple encryptions of the same plain text message. Further, a random dummy fill string may be used at the end of encrypted message string, as explained further below, to vary the length of the transmitted message and to further obscure the original message and random key.

Figure 4:
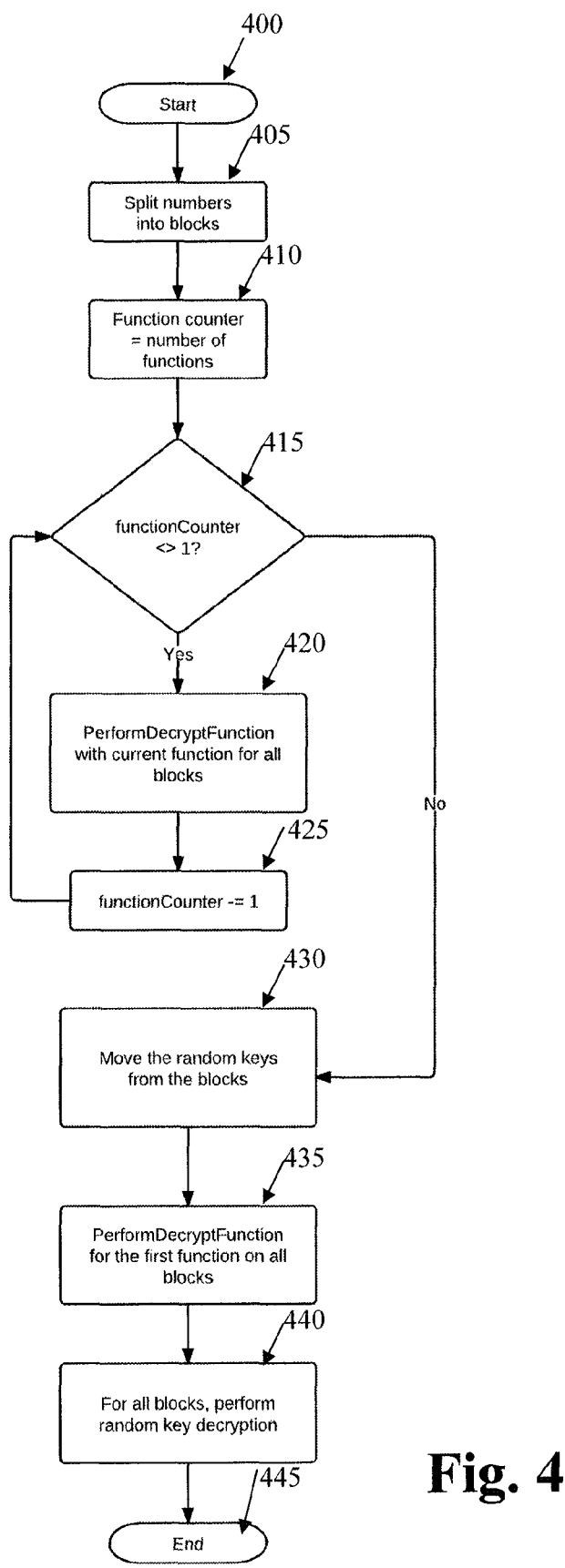
FIG. 4 is a flowchart of a decryption process in accordance with the preferred embodiment of this invention.
Figure 6:
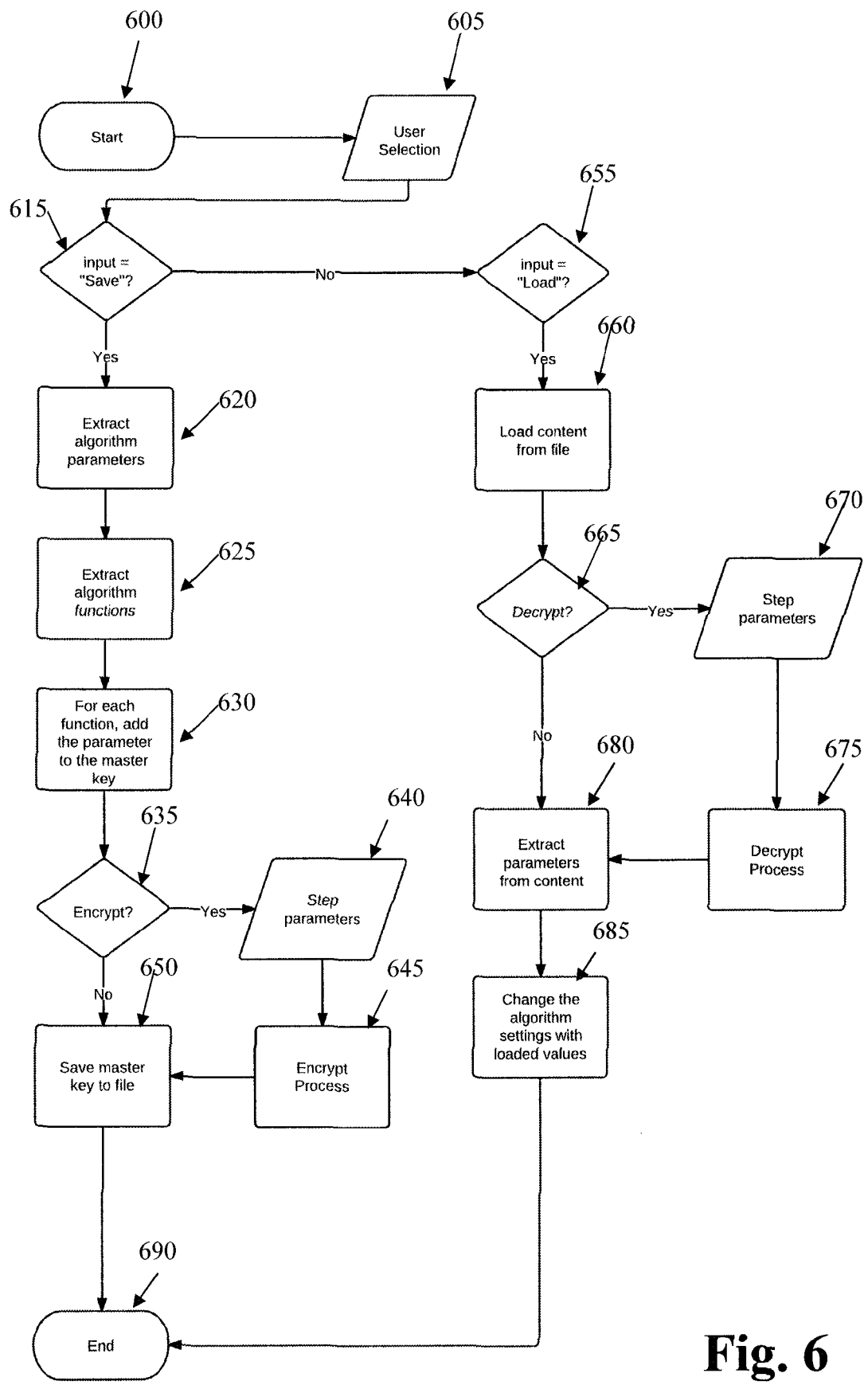
FIG. 6 is a flowchart of a master key generation process in accordance with the preferred embodiment of this invention.

Referring to the drawings in detail, wherein like reference numerals indicate like elements throughout, FIG. 1 is a flowchart of a selection process for selecting one of the encryption and decryption processes according to a preferred embodiment of the present invention. The selection process starts at step 100 and proceeds to step 105, where a user inputs a selection of one of the options, "Encrypt," "Decrypt," or "Generate Master Key." Depending on the user's selection, the relevant functionality is then called. If the user input is "Encrypt," at step 110, the process proceeds to the Encrypt Process at step 115 (see FIG. 2). Else, if the user input is "Decrypt," the process proceeds through step 120 to the Decrypt Process at step 125 (FIG. 4). Finally, if the user input is "Generate Master Key," the process proceeds through step 130 to the Generate Master Key process at step 135 (FIG. 6). If none of the choices are selected, the process remains at the User Selection step 105. Once execution of the selected option completes, the selection process ends at step 140.

Figure 2:
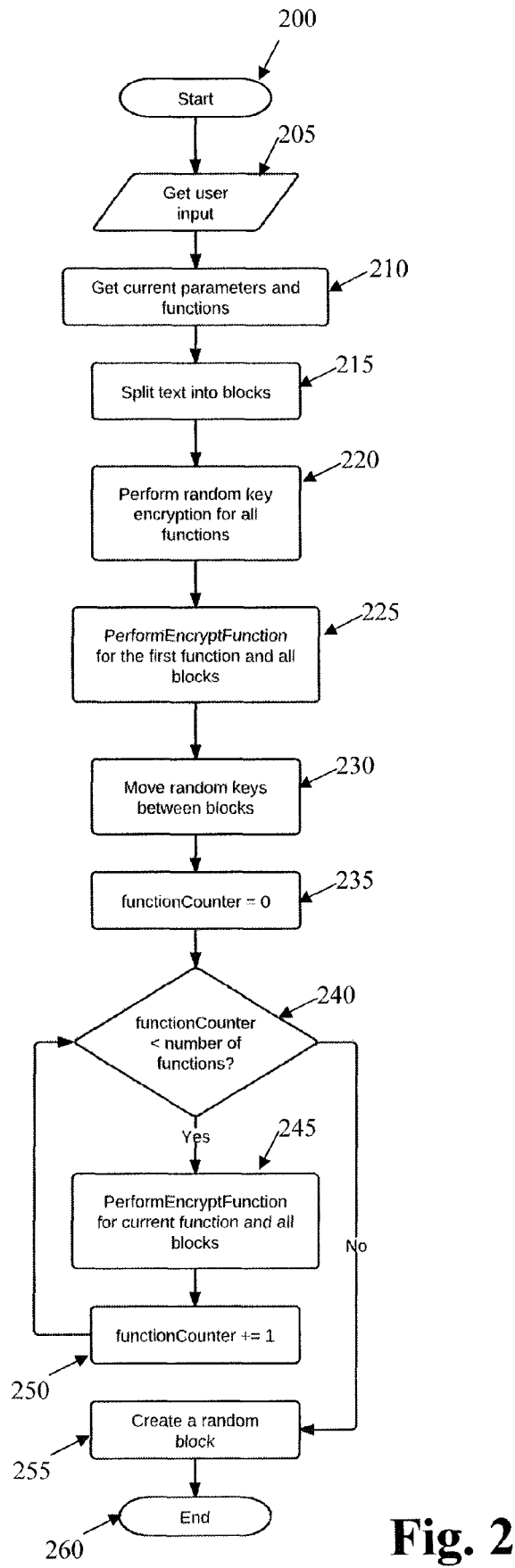
FIG. 2 is a flowchart of an encryption process in accordance with the preferred embodiment of this invention.

The encryption process will now be described with respect to FIG. 2. The encryption process starts at step 200 and proceeds to get user input at step 205. User input may be any alphanumeric input, in any language, such as text typed directly into a text input window on a keyboard, a previously input message identified by selecting a file containing the message to be encrypted, a selection of one of a plurality of pre-stored messages, or the like. Optionally, an end of message marker may be appended to the input text in order to facilitate decryption. Once the user input is received, at step 210, the encryption process gets current parameters and functions for use in performing the encryption.

The parameters and functions used by the encryption process depend on the details of an algorithm to be used in performing the encryption. Thus, the process must identify the algorithm currently selected by the user. The algorithm defines the sequence of encryption routines (substitution and/or transposition) to be performed and the specific pseudorandom generators used for each of these encryptions. Algorithm profiles make it easier for users to share algorithms with each other. Therefore, preferably the encryption and decryption applications are loaded with a list of default algorithm profiles. Examples of default algorithm profiles are listed in Table 1. Additional algorithms may be created by the user by specifying the necessary routine information.

TABLE 1

AF1001
APR1001.S102:S.L101:T.S103:S
APR1002.S102:S.L101:T
APR1003.S102:S.L101:T.S103:S.L101:T
APR1004.S103:S.S102:S
APR1005.S103:S.L101:T.S102:S
MasterKey.S102:S.L101:T The components of each of the algorithm profiles in Table 1 are each separated by periods. In each profile, the name of the algorithm is provided in the first position (e.g., APR1003, MasterKey). Thereafter, the name of a pseudorandom generator is identified in the even positions (e.g., after the first, third, fifth periods). The odd positions after the first position (e.g., after the second, fourth, fifth periods) identify the type of encryption (substitution or transposition) to be performed for each of the additional encryptions (i.e., the encryptions to be performed after the random key encryption). Therefore, the second and third positions indicate the first additional encryption to be performed and the fourth and fifth positions indicate the second additional encryption to be performed. Since the first additional encryption is always a substitution encryption, the third position always indicates a substitution encryption (S). Thereafter, each period separates a name of a pseudorandom generator and a type of encryption to be performed (S or T).

Based on the selected algorithm, an algorithm profile is loaded or extracted. The algorithm profile preferably identifies the parameters for each of the encryption routines, such as a step size to be used for each pseudorandom string. Once all the settings of the algorithm are loaded, the encryption process may begin. Referring to step 215, the user input is split into individual characters and then split into a number of blocks. The number of blocks and the number of characters in each block depends on the selected block size and the content size. The block size may be any value greater than 1, but larger block sizes are preferable as at least half of the block must be dedicated to the characters of the plain text. Accordingly, it is preferable that a block size greater than 10 characters is selected. The block size and content size are determined by the parameters received in step 210. Thus, if the block size is 2048 characters and the content size in each block is 896 characters, then there are 1152 empty character slots in each block. Each of the characters in the blocks is preferably represented by their ASCII value. ASCII values are coded with numbers from 0 to 255, modulus 256. However, in other embodiments, other encoding methods may be used to represent the characters.

Each of the blocks preferably includes three sections. The first section of each block includes a subset of characters from the text to be encrypted. The second section includes a random key used in the encryption. The size of these two sections is determined by the content size parameter and is specified by the user. The final section includes a string of random characters that is variable in length from 0 to infinity characters. This string helps to deter potential attackers by making it more difficult to guess the block size used during encryption. Thus, where the block size is 2048 characters, the Plain Text divided string would occupy the first 1 to 896 slots in the block string. The next 896 (slots 897 to 1792) characters would be occupied by random characters representing the random key. Finally, slots 1793 to 2048 would be occupied by the random fill characters. If more than one block is necessary to hold the entire message, multiple blocks would be created as described above.

Referring to step 220, a random key encryption is performed on each of the created blocks. The first step of the random key encryption is to generate the necessary random keys. In a preferred embodiment, the random keys for each encryption are generated on demand. However since this may be a slow process, in alternate embodiments, if the generation of the random numbers is slowing the application, then a buffer can be set up to be filled with random numbers during any idle time, or when the buffer is used. The buffer is then used to supply the random numbers without the generation delay, as needed by the application. Decryption is typically much faster than the encryption, because the random numbers are only generated during the encryption process and transmitted as part of the encrypted message string. Tested in a MICROSOFT WINDOWS environment, decryption was approximately four times faster than the encryption.

The random key encryption of step 220 is performed by using the first two sections of each block to perform a substitution encryption. A character (represented as a number) from the first section and a corresponding character (represented as a number) from the second section are taken. A modulus function addition is performed with these two characters to create an encrypted character (also represented as a number). While the operation is described as being a modulus addition, a modulus subtraction could also be performed without departing from the scope of this invention. Modulus arithmetic is well known to those skilled in the art and is not explained herein for sake of brevity.

Figure 3:
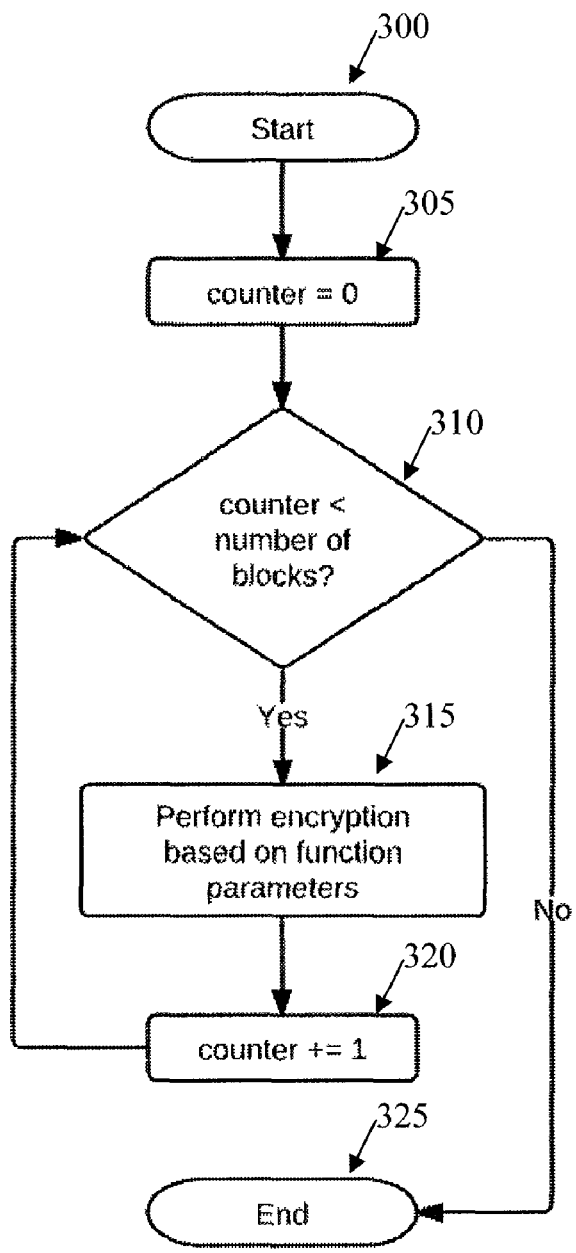
FIG. 3 is a flowchart of an execution process for performing the encryption process of FIG. 2.

Once the random key encryption is completed, at step 225, the first additional encryption is performed by calling the PerformEncryptFunction operation, which performs the execution process (FIG. 3). The first additional encryption is also a substitution encryption that uses a pseudorandom key to perform a modulus function with an ASCII representation of a corresponding character from the encrypted text. A list of pseudorandom keys is generated based on the parameters received in step 110 to perform this encryption.

In a preferred embodiment, an application used for the encryption process is supplied with one or more pseudorandom generators. The pseudorandom generators may be used to create different algorithms for use in the encryption and decryption processes. Examples of such pseudorandom generators are listed in the Appendix, together with the mathematical formula, the default parameters, and an example of the pseudorandom string generated for each. However, other pseudorandom generators may be used without departing from the scope of this invention.

Referring to FIG. 3, the PerformEncryptFunction process begins at step 300 and proceed to step 305, where a counter is initiated to a value of 0. Next, at step 310, it is determined whether the value of the counter is less than the number of blocks. If the counter value in step 310 is less than the number of blocks, at step 315, an encryption of one of the blocks is performed based on the function parameters from step 210 of FIG. 2. At step 320, the counter is incremented by 1 and the loop returns to the decision step 310. In this way, each of the blocks is encrypted by performing the substitution encryption on the data in the block by applying a generated pseudorandom string. When the counter equals the number of blocks in step 310, all blocks are encrypted for the given function and the process ends at step 325.

Next, in an optional step 230, the random keys in each of the blocks are moved between the blocks. Thus, the random key used for the encryption of block 1 may be placed in block 5, whereas the key for block 5 may be placed in block 7 and so forth. Repositioning of the random keys among the blocks makes potential attacks on the encrypted message more difficult. In an alternate embodiment, step 230 may be placed before step 225. In this case, the random keys are moved between the blocks prior to the substitution encryption with the pseudorandom string being performed.

Figure 8:
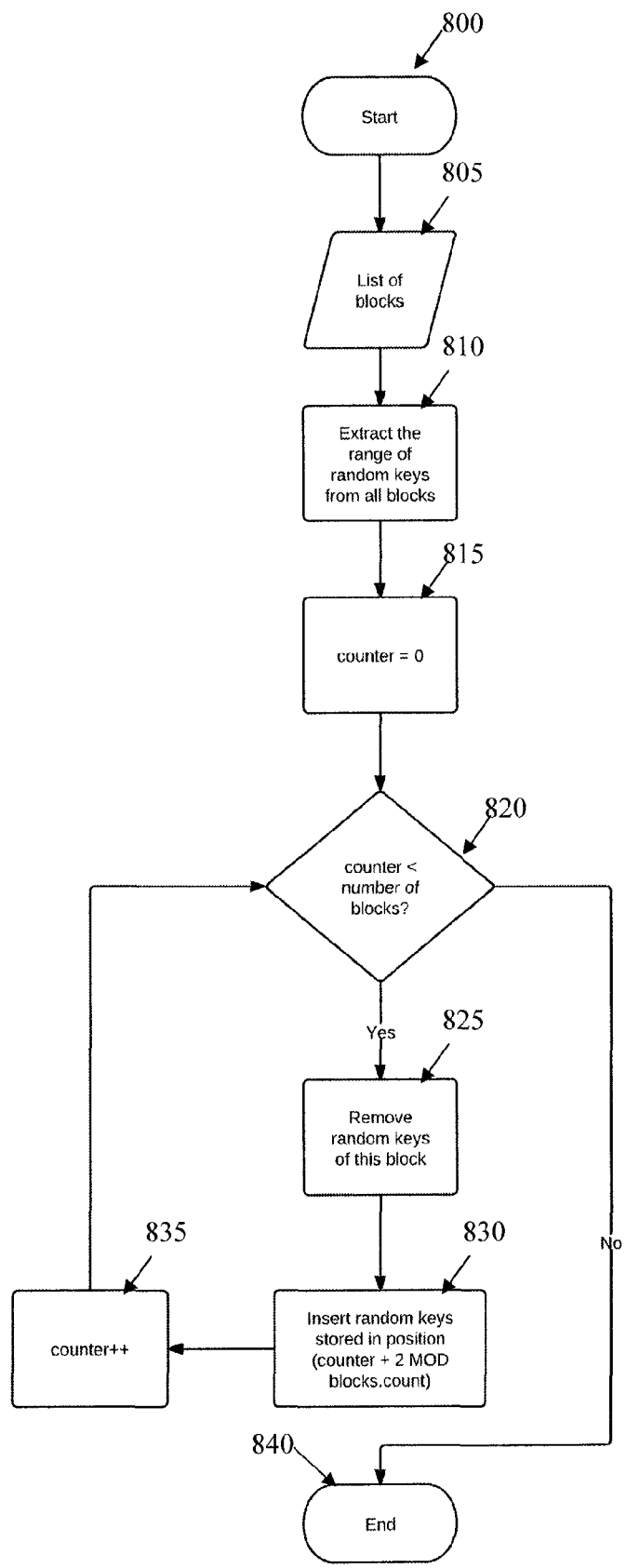
FIG. 8 is a flowchart of a process for shifting the random keys between blocks in accordance with the preferred embodiment of this invention.

The repositioning process of the random keys is described with respect to FIG. 8. The process starts at step 800 and proceeds to step 805, where the blocks are listed. At step 810, the range of random keys are extracted from all the blocks. A counter is initialized to 0 at step 815 and at step 820, it is determined whether the value of the counter is less than the number of blocks. If so, at step 825, the process removes random keys of the block being processed and at step 830, the random keys are inserted in a block at another position. The counter is incremented at step 835. The loop repeats until all blocks have been processed and then ends at step 840.

Returning to FIG. 2, once the message is encrypted with the random string and the first substitution encryption, and the random keys are moved between the blocks, at steps 235-250, one or more additional encryptions may be performed using pseudorandom strings generated for each of the additional encryptions. Any number of such additional encryptions may be performed, depending on the desires of the encrypting party.

The additional encryptions are performed by first initializing a function counter to 0 at step 235 in order to count the number of encryption functions that have been performed. At step 240, it is determined whether the function counter is less than the total number of encryption functions to be performed. If the number is less, at step 245, the additional encryption is performed by executing the PerformEncryptFunction operation (FIG. 3). Upon completion, the function counter is incremented by 1 at step 250 and execution returns to the determination step 240. This loop continues until the value of the function counter equals the total number of functions to be performed.

The pseudorandom strings used in each of these additional encryptions depend on the parameters and functions selected in step 210 and are generated using the default pseudorandom number generators provided in the library of the encryption application or based on new pseudorandom number generators input by the user. For each such subsequent encryption, a vast variety of possible sequences of substitution and transposition encryptions may be chosen. However, it is preferable to alternate between substitution and transposition encryptions in order to make the decryption process sequence sensitive. Therefore, since the first two encryptions were both substitution encryptions, it is preferable that the next (i.e., third) encryption is a transposition encryption.

In a transposition encryption, the pseudorandom key is sorted in ascending order, with the resulting list of keys representing the position where each character of the encrypted text should be placed. Thus, when the pseudorandom string or the pseudorandom generator used to create the string is known, it is possible to determine the original order of the characters and return them to their original positions. In using a transposition encryption, it is important that the values of the generated pseudorandom string do not repeat so that only one unique order of values is possible.

In performing the additional encryptions, the pseudorandom keys may be utilized starting at an initial position (e.g., the first value in the pseudorandom string). However, for additional security, a step parameter may be specified in step 210. This step parameter specifies the index to extract the pseudorandom keys from a particular list of generated keys. As an example, consider the following algorithm, which consists of two routines, S1 and S2. S1 has a step size of 11, while S2 has a step size of 13. The step size is a local parameter to the routine, so every routine (i.e., encryption function) will specify a different step size. After the random keys are generated for S1, the first key used for the first block is located at position 11, according to the step parameter. For the second block, however, the first key will be located at position 22. For subsequent blocks, the first key would be located at positions 33, 44, 55, and so forth. Similarly, for the routine S2, the first key used for the first block is located at position 13, the first key for the second block is located at position 26, and so forth.

Returning to FIG. 2, once the total number of functions to be performed is reached, execution advances to an optional step 255, where a random block of text is created. At step 255, each of the blocks includes 1) a part of the encrypted message, 2) a part of the random keys, and 3) some dummy data. A single encrypted message string is generated by appending all the different characters from all the encrypted blocks along with the random block of text. The characters of the encrypted message string are separated by blank spaces. The random block of text is added to further deter attackers from being able to decrypt the message by masking the number of blocks used and the individual block size. The size of this random block may be any random number between 1 and the actual block size parameter received in step 210. The encryption process ends at step 260.

The entire encrypted message string is now ready to be transmitted to a receiver. When the encrypted message string is received by a receiver, it may only be decrypted with knowledge of the exact parameters and functions and their sequence used during encryption. Referring to FIG. 4, the decryption process begins at step 400, where the received encrypted message string is loaded (e.g., from a received file, e-mail message or the like). Additionally, the correct algorithm profile and its settings are loaded. The process proceeds to step 405, where the characters in the received encrypted message string are split into separate blocks based on the loaded settings, such as the block size.

To create the separate blocks, the decrypting process determines the block size used for the encryption based on the loaded settings, and creates the necessary number of blocks by filling each block with enough characters from the encrypted message string to fill up the block size. The characters are filled into the blocks in the same order as they appear in the encrypted message string. If the encryption process included the dummy block at the end of the encrypted message string, it is removed prior to performing the decryption functions. When all the blocks are split up in step 405, the dummy block is located at the end of the message. The dummy block may the be removed by deleting or otherwise disregarding the last block. The transposition and/or substitution decryption functions may now be performed on each of the remaining blocks.

For transposition encryptions, decryption must be performed using the same pseudorandom string used for the encryption. The values of the pseudorandom string are sorted against a string of integers in sequence from 1 to the block size. Then, this string is sorted against the block string in order to decrypt. The pseudorandom generator using the same parameters as for encryption is called to produce the same pseudorandom string, this is then sorted against a number sequence from 1 to 2048. This sorted number sequence is then sorted against the block string in order to return the proper original block string.

For substitution encryptions, decryption is performed by performing the modulus arithmetic that is opposite that used during encryption. Thus, where the substitution encryption utilized a modulus addition, during decryption, a modulus subtraction is performed. Similarly, if the substitution encryption utilized a modulus subtraction, during decryption, a modulus addition is performed.

Figure 5:
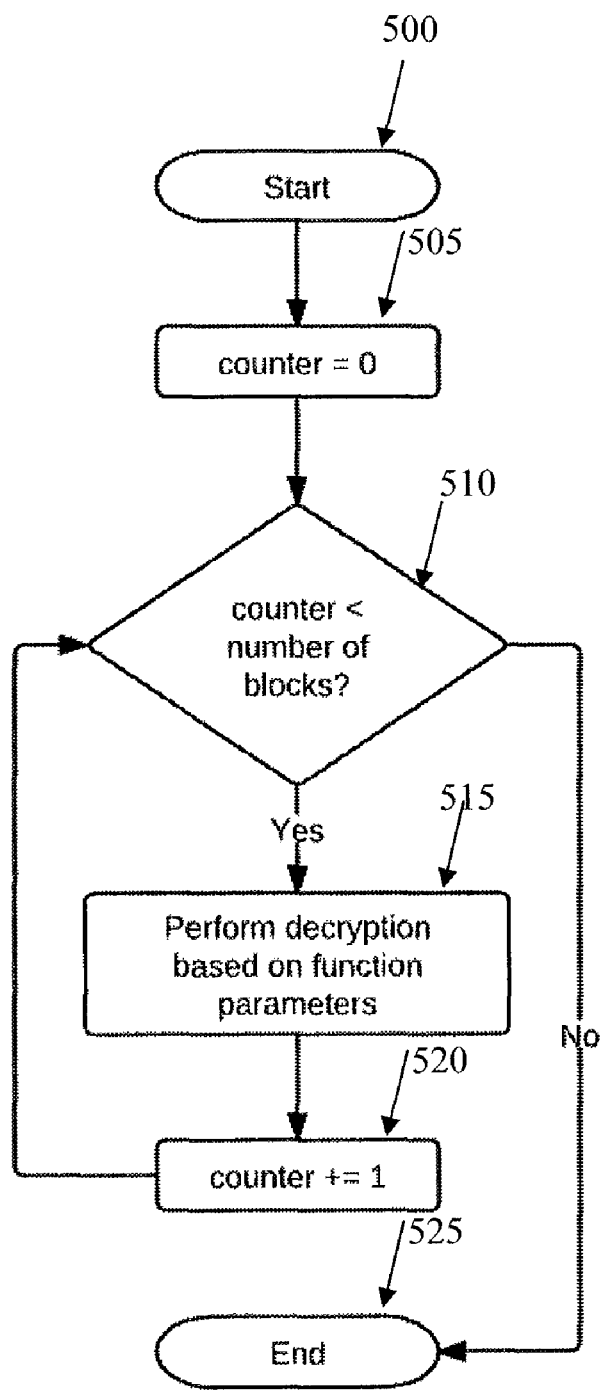
FIG. 5 is a flowchart of an execution processing for performing the decryption process of FIG. 4.

At step 410, a function counter is initiated to the number of functions performed in the encryption. At step 415, it is determined whether the value of the function counter is greater than 1. If so, at step 420, the first decryption function is performed by executing the PerformDecryptFunction operation (FIG. 5). The function counter is decremented by 1 at step 425 and the loop returns to step 415. Each of the functions must be performed in the reverse order from the order they were performed in for the encryption process. That is, the encryption function performed last is performed first in the decryption process. The PerformDecryptFunction will now be described with reference to FIG. 5. The decryption routines are performed on each of the blocks separately. The decryption execution process starts at step 500 and proceeds to step 505, where a counter is set to 0. At step 510, it is determined if the value of the counter is less than the number of blocks created in step 405. If so, at step 515, the decryption for one of the blocks is performed based on the function parameters. The counter is incremented at step 520 and the loop returns to step 510. Once it is determined that all of the blocks have been decrypted for the given function, by determining that the value of the counter equals the number of blocks at step 510, the process ends at step 525.

Returning to FIG. 4, once it is determined that the function counter equals 1 at step 415, all necessary decryptions have been performed except the random key substitution decryption and the second substitution decryption. The process now proceeds to step 430, where the random keys are moved to their proper blocks. Again the movement of the blocks is facilitated by the receiver's knowledge of the parameters used by the sender for the encryption process. Once the random keys are in their proper positions, the second to last decryption is performed at step 435 by again calling the PerformDecryptFunction. This decryption is always a substitution decryption because it corresponds to the first encryption performed after the random key encryption. The decryption is performed as described above with respect to FIG. 5 by performing the modulus arithmetic opposite that used for the encryption with the corresponding pseudorandom string. In an alternate embodiment, if the order of steps 225 and 230 of FIG. 2 was reversed, the substitution decryption of step 435 may be performed prior to the moving of the random keys of step 430.

After completing the substitution decryption, at step 440, the random key decryption is performed on each of the blocks by applying the random key belonging to the block being decrypted. The decryption process performs modulus arithmetic opposite that performed during encryption. Thus, if modulus addition arithmetic was performed during the encryption, modulus subtraction arithmetic is now performed. However, if a modulus subtraction arithmetic was performed during encryption, a modulus addition arithmetic would be performed for the decryption. The decryption stops when the functions specified by the algorithm used are completed.

Referring to FIG. 6, a flowchart of a master key generation process for use with the random key encryption will now be described. The process begins at step 600 and proceeds to a user selection step 605. When an input is received, at step 615, it is determined whether the input was "Save," and if so, the process proceeds to step 620. Otherwise, the process proceeds to step 655 for a "Load" input.

The Save process starts by extracting the algorithm parameters at step 620 and then extracting the algorithm functions at step 625. Next, for each function, the extracted parameters are added to the master key. At step 635, it is determined whether the master key is to be encrypted. If not, the master key file is saved to a file at step 650 and the process ends at step 690. If it is determined that the master key should be encrypted, at step 640, the block size and content size parameters for the encryption are determined and the encryption process is performed at step 645. Once the encryption process is completed, the encrypted master key is saved to a file at step 650.

Figure 7:
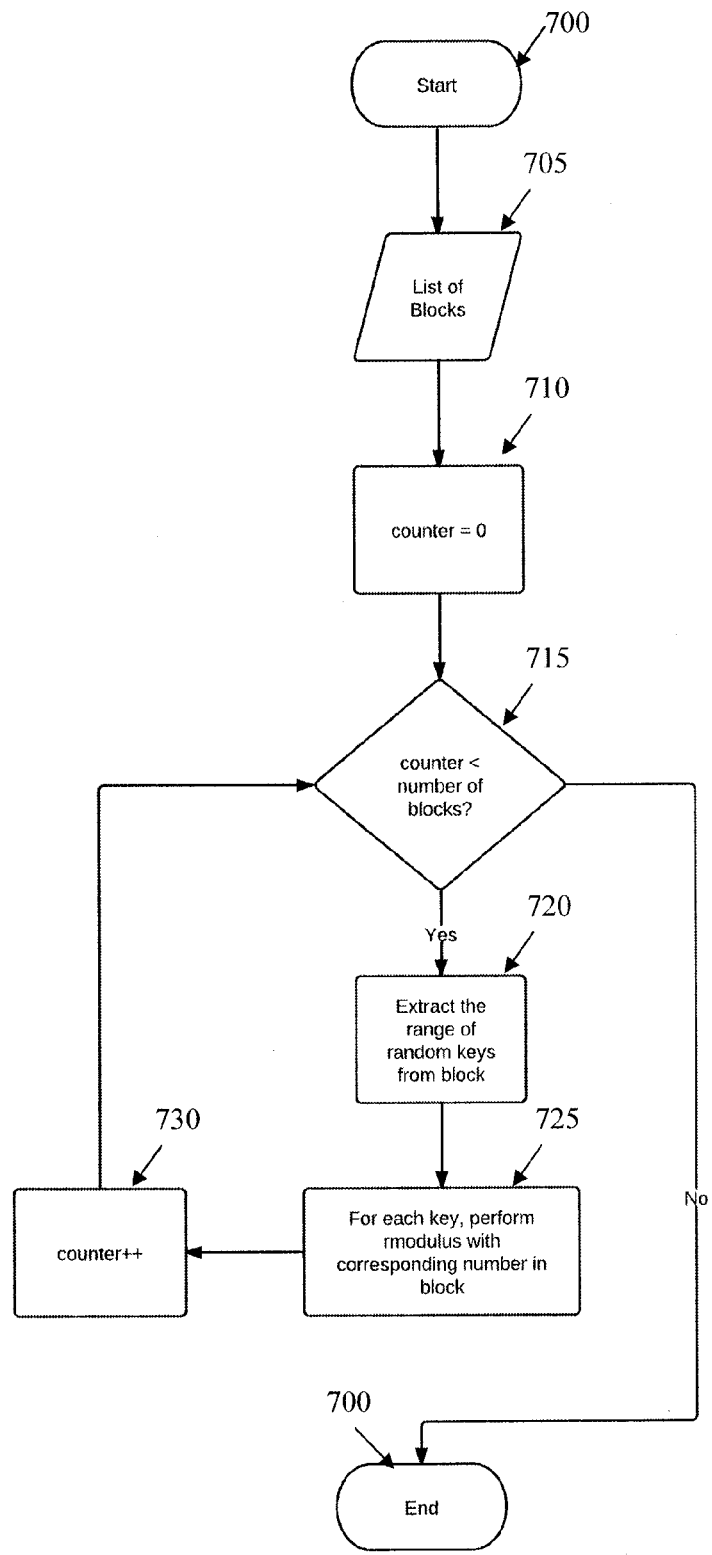
FIG. 7 is a flowchart of a master key encryption process in accordance with the preferred embodiment of this invention.

The master key encryption process of step 645 is similar to that described above and is now described with respect to FIG. 7. The function of FIG. 7 accepts a list of blocks and for each block, the range of random keys is extracted from the block, using the block size and content size. For each extracted key, a modulus arithmetic function is performed between the number representing the current character and the corresponding random key. The encryption process begins at step 700 and proceeds to step 705, where the list of blocks is identified. At step 710, a counter is initialized to 0 and at step 715, it is determined if the value of the counter is less than the number of blocks. If so, at step 720, the range of random keys is extracted from the a block and at step 725, a modulus arithmetic operation is performed for each key with the corresponding number in the block. The counter is incremented at step 730 and the loop returns to the decision step 715. When the value of the counter equals the number of blocks, the process ends at step 735.

Returning to FIG. 6, if the user selection is "Load," the process proceeds through step 655 to load the encrypted key from a file at step 660. At step 665, it is determined whether the file must be decrypted. If so, the step parameters are determined at step 670 and the decrypt process is performed at step 675. The decrypt process reverses the steps of the encryption process of FIG. 7 and is similar to the decryption process described above. A description of the decryption process is omitted here for sake of brevity. Whether the file had to be decrypted or not, at step 680, the parameters are extracted from the decrypted content and at step 685, the algorithm settings are changed with the loaded values. The process then ends at step 690. An example of default master keys for use in the encryption and decryption process are provided in Table 2 below. However, other master keys may be created by the user.

TABLE 2

2048.896.AF1001
2048.896.APR1001;7879.77.109.9851477.256.10.S;
16807.77.999.2147483647.10.T;7879.77.77.9851477.256.10.S
2048.896.APR1002;7879.77.109.9851477.256.10.S;
16807.77.999.2147483647.10.T
2048.896.APR1003;7879.77.109.9851477.256.10.S;
16807.77.999.2147483647.10.T;7879.77.77.9851477.256.10.S;
16807.77.999.2147483647.10.T
2048.896.APR1004;7879.77.77.9851477.256.10.S;
7879.77.109.9851477.256.10.S
2048.896.APR1005;7879.77.77.9851477.256.10.S;
16807.77.999.2147483647.10.T;7879.77.109.9851477.256.10.S
2048.896.APR1005;7879.77.77.9851477.256.103;
16807.77.999.2147483647.10.T;
7879.77.109.9851477.256.10.S
2048.896.MasterKey;7879.77.109.9851477.256.10.S;
16807.77.999.2147483647.10.T In Table 2, the components of each of the default master keys are separated by periods and semicolons. Periods separate the portions of the master key, while semicolons separate the individual elements of the master key. The first position indicates the block length. The second position is separated from the first position by a period and indicates the length (in characters) of the plain text in each block. The third position is separated from the second position by a decimal point and indicates the name of the algorithm profile (see Table 1). The next portion of the master key is separated from the first portion by a semicolon. The second portion provides the parameters of the pseudorandom generator, a step amount to be used in selecting values of a pseudorandom string, and a type of encryption to be performed (S for Substitution or T for Transposition). Each subsequent portion of the master key provides information for each subsequent encryption (parameters of the pseudorandom generator, step amount and type of encryption).

Figure 9:
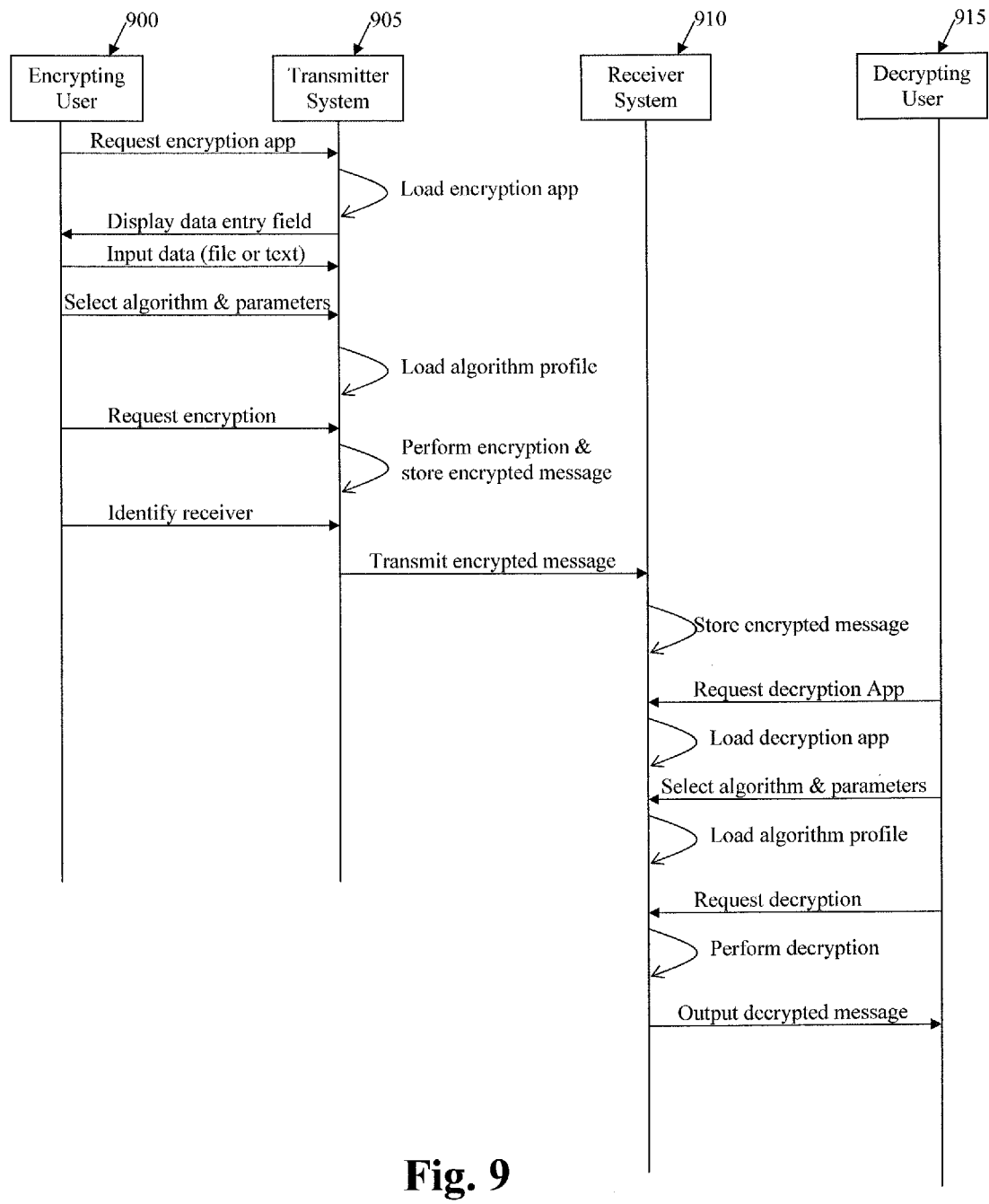
FIG. 9 is a sequence diagram of communications during the encryption and decryption processes.

FIG. 9 is a high level overview of the process for encrypting and decrypting a plain text message using a transmitter system 905 and a receiver system 910. Preferably, each of the transmitter system 905 and the receiver system 910 are computing devices having a display, a processor, one or more input/output devices, a memory (temporary and/or permanent) and a wired and/or wireless communications interface. Examples of such computing devices include personal computers, servers, and portable devices (e.g., smartphones, netbooks, tablet, and the like). However, any other computing device may be used for encrypting and/or decrypting a plain text message without departing from the scope of this invention. In operation, an encrypting user 900 requests a transmitter system 905 to load an encryption application by, for example, clicking on an icon corresponding to the application on a graphical user interface ("GUI"). Alternatively, the user could type in a path to the application's executable file using a keyboard or any other input device. The transmitter system 905 loads the encryption application, which preferably has its own GUI.

The displayed GUI of the encryption application allows the encrypting user 900 to enter a plain text message to be encrypted by typing the message into a text field or by selecting a file containing plain text to be loaded into the text field. Additionally, the GUI allows the encrypting user 900 to select (or create a new) algorithm profile for performing the encryption. Upon receiving a selection of an algorithm, the transmitter system 905 loads the corresponding algorithm profile and any additionally required parameters. The encrypting user 900 may then request the encryption operation to be performed and the encryption application loaded on the transmitter system 905 performs the encryption as described above.

The encrypted message is transmitted by the transmitter system 905 to a receiver system 910. The encrypted message may be sent over a network by a direct or indirect file transfer, using a file sharing service such as DROPBOX, by attaching a file containing the encrypted message string to an e-mail or by pasting the contents of the encrypted message string into the body of the e-mail, or by means of any other method of electronic data transmission. Alternatively, the file may be stored on a transportable media such as an optical disc and physically transported to the receiver system 910.

The receiver system 910 stores the encrypted message either in permanent memory, such as a hard disk drive or flash memory, or it may store the encrypted message in a temporary memory such as Random Access Memory ("RAM") until it is decrypted. The decrypting user 915 requests to load the decryption application on the receiver system 910. In a preferred embodiment, the encrypting application and the decrypting application are the same. However, in other embodiments, distinct applications may be provided. Once the receiver system 910 loads the decryption application, the decrypting user 915 selects the algorithm profile and parameters for decrypting the encrypted message. The receiver system 910 loads the algorithm profile for the decryption based on the decrypting user's 915 selections. Once the algorithm profile is loaded, the decrypting user 915 requests decryption. However, in other embodiments, the decryption may also begin automatically once the algorithm profile is loaded. The receiver system 910 performs the decryption as described above and outputs the decrypted, original, message to the decrypting user 915.

Encryption/Decryption Example

An example of the encryption and decryption processes described above will now be provided to further illustrate the preferred embodiment of this invention. In this example, a plain text message having 2,000 characters, including an end of message sequence, will be encrypted using the parameters of a block size of 2,048 characters, and a 896 plain text message size assigned to each block. When the encryption process begins, the message is divided as follows: 896 characters in a first block, 896 characters in a second block, and 208 characters in a third block.

The first block contains the first 896 characters of the plain text, 896 characters of a random key, and 256 random fill characters. The second block contains the second 896 characters of the plain text, 896 characters of a random key, and 256 random fill characters. Finally, the third block contains the last 208 plain text. Since each block's plain text section must be filled with characters, the remaining 688 characters of the plain text section are filled with 688 random fill characters. The third block also includes 896 characters of a Random Key, and 256 random fill characters.

Once the blocks are created, the first, random key, encryption is performed. This encryption is a substitution encryption. For each block, the 896 character random key in that block is applied against the corresponding 896 character plain text of that block. Note that in the third block, the random key is applied against the 208 characters of the plain text portion, as well as the remaining 688 random fill characters. However, in alternate embodiments, the random key encryption need not be performed against the random fill characters.

After completing the substitution encryption on each block, each of the three blocks contains the randomly encrypted plain text, the corresponding random keys, and some random fill characters. The encrypted plain text is now perfectly random taken alone and the random key is perfectly random taken alone. However there is a relationship between them, which is the plain text message.

In order to make an attack more difficult, the random keys are shifted between the blocks. For example, if a shift of 2 steps were chosen, then random key from block 1 would be moved to block 3, the random key from block 2 would be moved to block 1, and the random key from block 3 would be moved to block 2. In this case, the random key step amount would be another parameter.

In alternate embodiments, a more sophisticated shift may be performed by, for example, doing a random shift similar to the random transposition sort. In this case, the algorithm chooses a pseudorandom generator from a library of pseudorandom generators. A string from this generator is chosen having a length equal to the number of blocks starting with a location determined by a step parameter. This string is sorted against a number sequence 1-(number of blocks). This resulting string would then direct the shifting of the random keys. For example, where there are three blocks, the pseudorandom string may create a sort sequence of 312. Therefore, the random key from block 3 would be moved to block 1, the random key from block 1 would be moved to block 2, and the random key from block 2 would be moved to block 3.

Next, a second substitution encryption is performed on the encrypted plain text of each of the blocks using a pseudorandom string from a pseudorandom generator selected from the library of pseudorandom generators. Since the parameters of the pseudorandom generator are adjustable, the exact parameter settings used will be part of the master key. This encryption destroys the message relationship between the encrypted plain text and the corresponding random key. Alternatively, the encryption could be performed on the entire block string and not just the encrypted plain text portion of the block.

As described above, it is preferable to alternate between substitution and transposition encryptions. Accordingly, the third exemplary encryption is a transposition encryption. The algorithm calls one of the pseudorandom generators from the library and matches the generated pseudorandom string with the encrypted block string, which is then sorted to produce a random transposition. The parameters of this pseudorandom generator are adjustable and the exact parameter settings used will be part of the master key. Again, the step parameter causes the selection of a different section of the pseudorandom string for each block. Thereafter, a substitution encryption is performed on the encrypted block string using a pseudorandom generator called from the library. Again, the parameters of this pseudorandom generator are adjustable and the exact parameter settings used will be part of the master key. The substitution encryption is performed as described above.

While four encryption functions are described in this example, additional encryptions may be performed depending on the settings and desires of the encrypting party. Once all encryptions have been completed, the blocks are sequentially concatenated, along with a string of random dummy characters at the end of the message to create the encrypted message string. The size of the string of random dummy characters is randomly chosen from 0 to (block size−1) in order to make it more difficult to determine the block size used for the encryption.

The encrypted message string is now ready to be transmitted to a receiver over a network, such as the Internet, or any other electronic transmission medium. Once the encrypted message string is received by the receiver, it may be decrypted. In order to decrypt, the appropriate parameters, such as the block size, pseudorandom generators and the step size, must be selected. It is impossible for an attacker to decrypt the encrypted message string without the block size parameter.

During decryption, the encrypted message string is split up into blocks, each block having a length of 2,048 characters. The random dummy string that was concatenated is removed by removing all characters remaining after the last block. Thus, the remainder after division of the message length by the block size is deleted. Decryption of the blocks is performed in reverse of the sequence up to the random key decryption. Thus, the process would perform a substitution decryption, followed by a transposition decryption, followed by another substitution decryption.

Each decryption uses the pseudorandom string and step size used during the corresponding encryption. If modulus addition is used for substitution encryption then modulus subtraction is used for substitution decryption, and vice versa. For the transposition decryption the pseudorandom generator using the same parameters as for encryption is called to produce the same pseudorandom string, the string is then sorted against a number sequence from 1 to 2048. This sorted number sequence is then sorted against the block string in order to return the proper original block string.

After each of these decryptions is completed, the random key shift must be reversed to return the random keys to their proper blocks. The plain text may now be decrypted by performing the substitution decryption on each of the blocks using the random key corresponding to that block. If modulus addition is used for substitution encryption then modulus subtraction is used for substitution decryption, and vice versa. After all of the blocks are decrypted, the Plain Text is extracted and sequentially concatenated and terminated at the end of message marker.

Referring to FIGS. 10 and 12-15, exemplary embodiments of an encryption/decryption application 1000 for implementing the systems and methods described above are shown. Referring to FIG. 10a, the encryption/decryption application 1000 includes a Plain Text tab 1005 and a Cipher Text tab 1010. Switching between these tabs allows a user to switch between viewing the plain text message and the encrypted message. As shown in FIG. 10b, the Plain Text tab 1005, displays a text entry window 1020 that allows the user to type a plain text message for encryption or displays a plain text message after it has been decrypted. The Plain Text message shown in FIG. 10b is encoded using the encryption algorithms described above, and is shown in its cipher text decimal representation 1100 in FIG. 11.

Figure 10A:
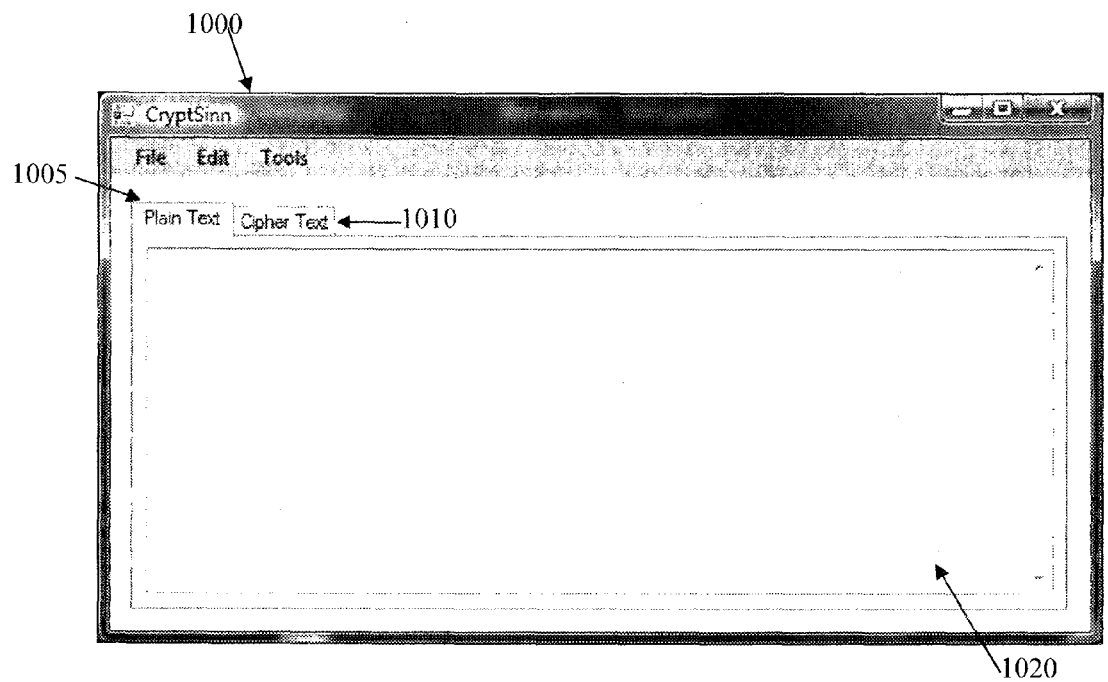
FIG. 10a is an exemplary encryption/decryption application showing a plain text entry tab in accordance with the preferred embodiment of this invention.
Figure 10B:
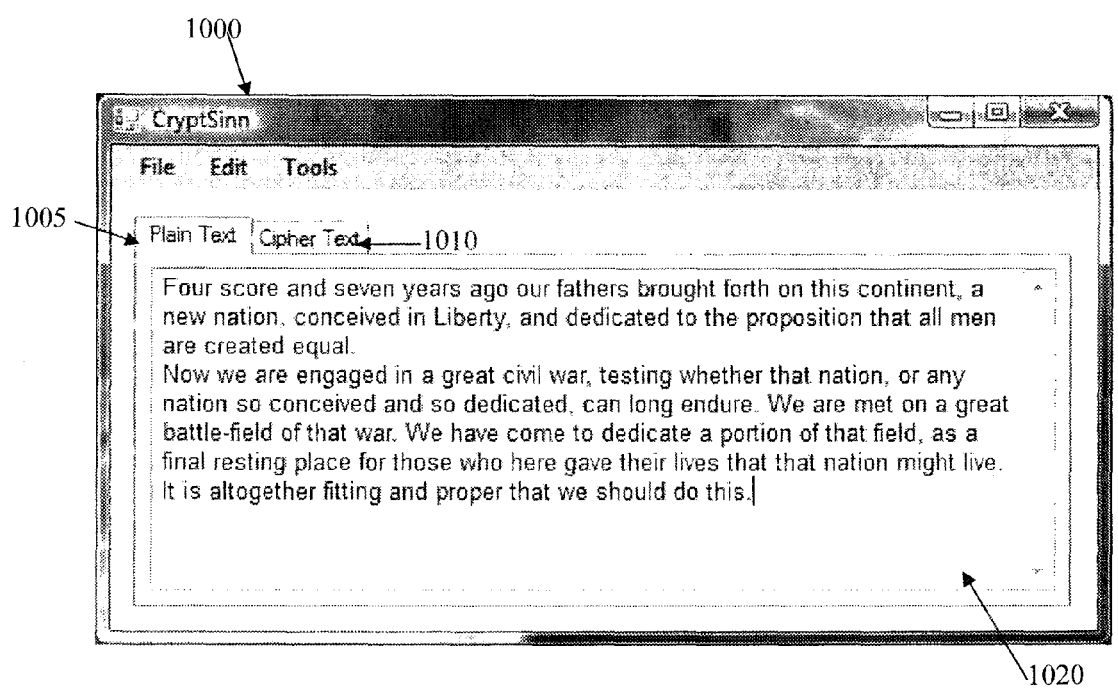
FIG. 10b is the plain text entry tab of FIG. 10a with an exemplary plain text message input.
Figure 11:
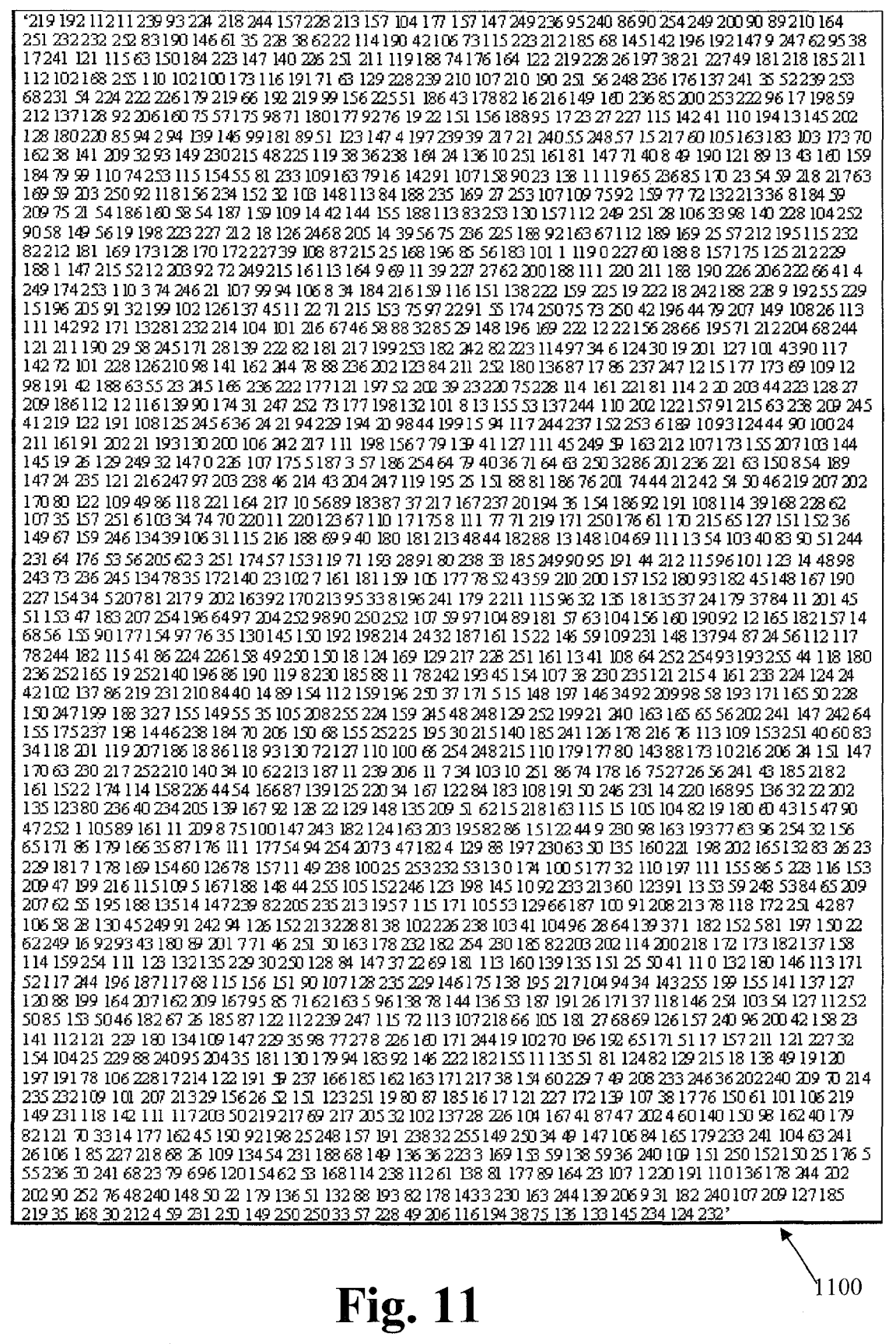
Figure 12A:
FIG. 12a is a cipher text tab of the exemplary encryption/decryption application of FIG. 10a, showing the cipher character text encrypted message string corresponding to the decimal message string of FIG. 11 generated by the first encryption of the plain text message input of FIG. 10b.
Figure 12B:
FIG. 12b is the same cipher text tab of FIG. 12a showing a cipher character text encrypted message string generated by a second encryption of the plain text message input of FIG. 10b.
Figure 13:
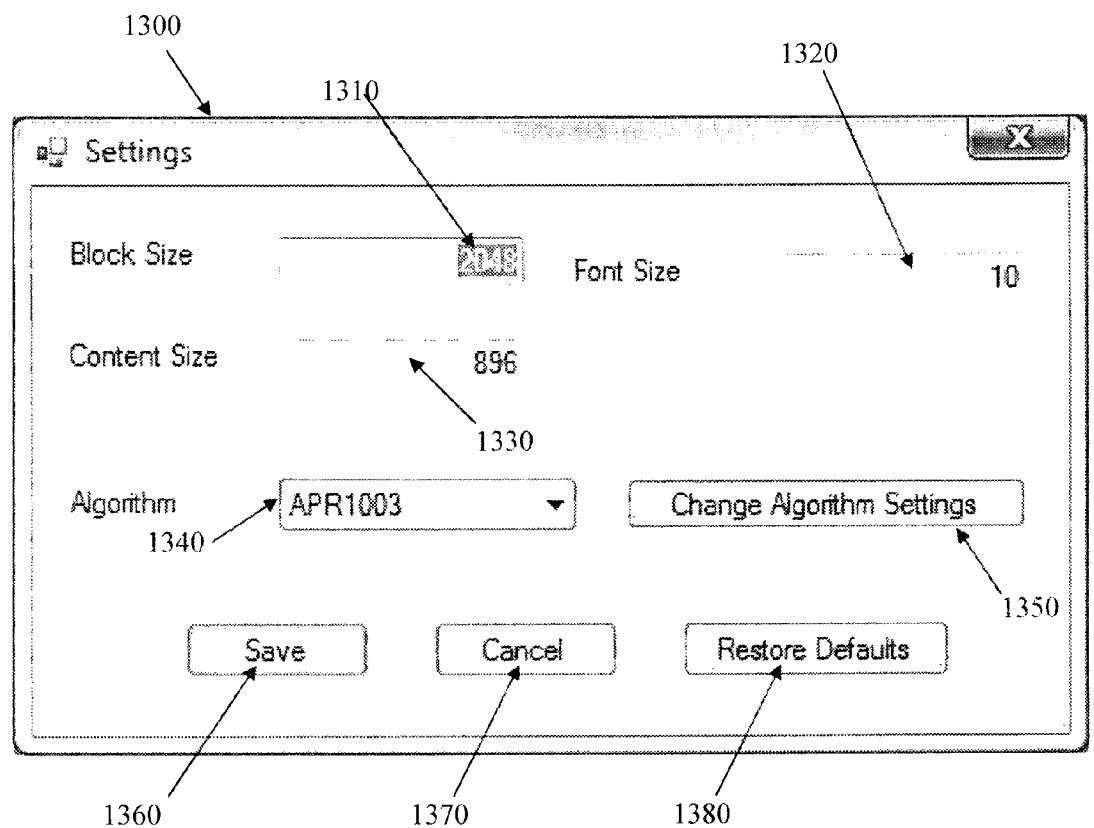

The plain text message shown in FIG. 10b and in cipher text decimal in FIG. 11 is shown in an encrypted form in the cipher text window 1030 of the Cipher Text tab 1010 in FIG. 12a. A second encrypted form of the plain text message of FIG. 10b is shown in FIG. 12b. While the encrypted strings shown in the cipher text window 1030 in FIGS. 12a and 12b were encrypted using the same algorithm profile and correspond to the same plain text message shown in FIG. 10b, the encrypted strings of FIGS. 12a and 12b are different. This is due to the use of random keys and the inclusion of random fill characters in each block and the additional random dummy block. A cipher text decimal representation corresponding to the encrypted form of the message in FIG. 10b is not shown, but it is different from that shown in FIG. 11.

Figure 14:
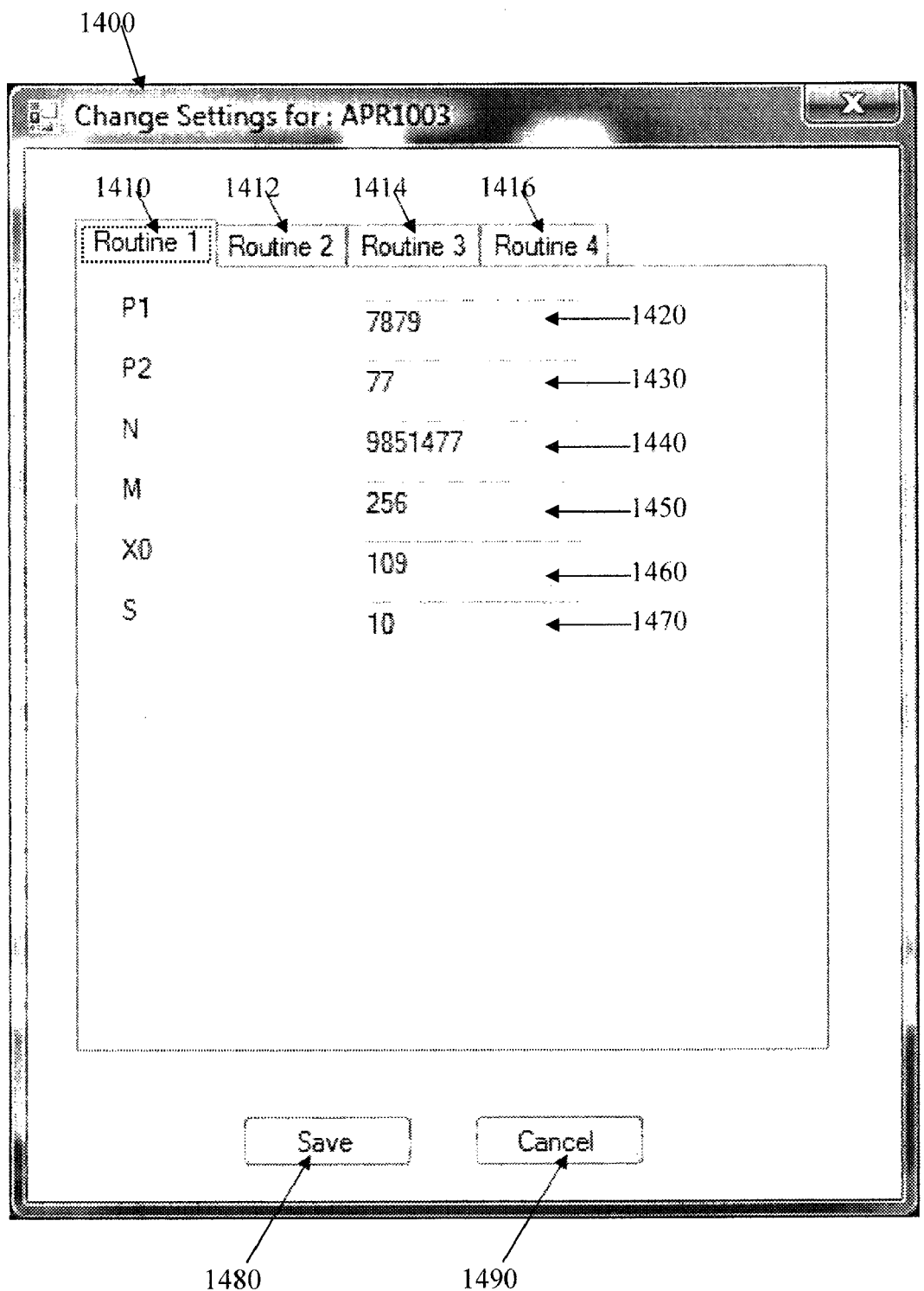

FIG. 14 is an exemplary settings window 1300 showing changeable parameters for performing an encryption and/or decryption. The settings window 1300 includes a block size setting 1310, a font size setting 1320 and a content size setting 1330. These are global parameters and changes in any these three parameters which are saved will change those parameters for all of the saved algorithms. Content Size cannot be greater than one half of the Block Size. The algorithm to be used in the encryption and/or decryption may be selected using the algorithm drop down box 1340. Settings of the selected algorithm may be changed by selecting the Change Algorithm Settings button 1350. Changes to the settings are saved by pressing the Save button 1360, or are disregarded by pressing the Cancel button 1370. Any saved changes can be reset to their defaults by pressing the Restore Defaults button 1380. Referring to FIG. 14, the Change Algorithm Settings screen 1400, accessed by pressing the Change Algorithm Settings button 1350, is shown. Each routine that is part of the selected algorithm is shown in separate tabs on the Change Algorithm Settings screen 1400. The selected tab for Routine 1 1410 displays parameters (P1 1420, P2 1430, N 1440, M 1450, X0 1460 and S 1470) that may be changed for the selected routine. The parameters affect the pseudorandom string that will be generated and are local to each algorithm. Therefore, any adjustments do not affect the other algorithms. Settings for other routines are accessed by pressing the corresponding tab 1412, 1414, 1416. Settings are saved by pressing the Save button 1480, or cancelled by pressing the Cancel button 1490.

Figure 15A:
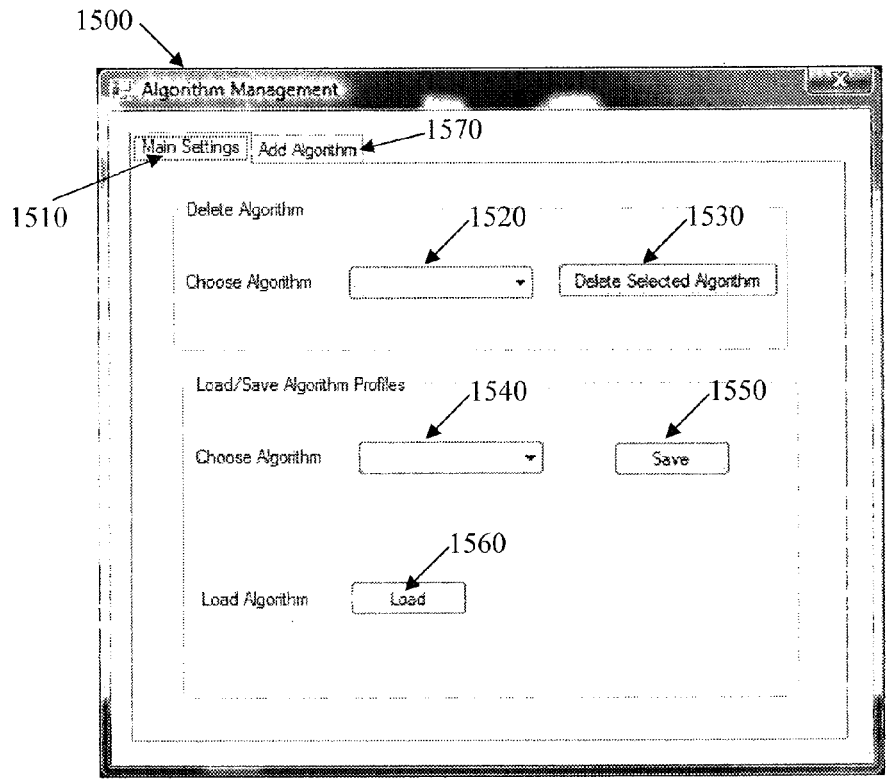
Figure 15B:
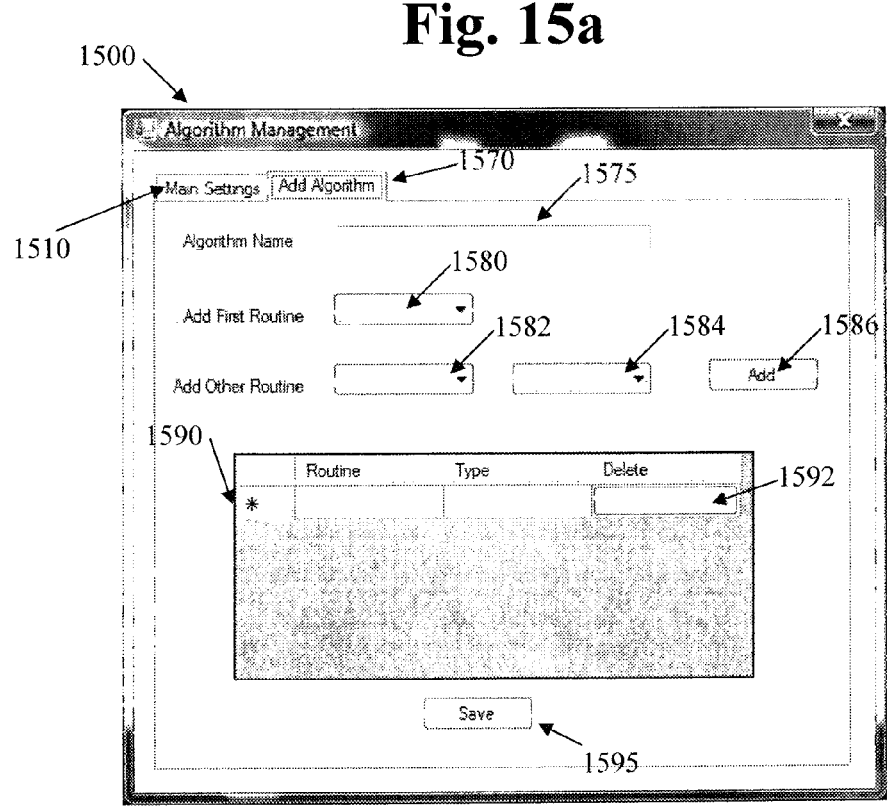

FIG. 15 is an exemplary algorithm management screen 1500. In a Main Settings tab 1510, an algorithm may be deleted by selecting an algorithm from the Choose Algorithm drop down box 1520 and pressing the Delete Selected Algorithm button 1530. Algorithm profiles may be saved by selecting an algorithm from the Choose Algorithm drop down box 1540 and pressing the Save button 1550. An algorithm is loaded by pressing the Load button 1560 and selecting a file containing an algorithm from a file selection window (not shown). A new algorithm may be added by switching to the Add Algorithm tab 1570.

The Add Algorithm tab 1570 allows a user to define a new algorithm, including one or more routines. The user inputs a name for the new algorithm by entering it into the Algorithm Name entry text box 1575. The First Routine for the new algorithm is selected using the Add First Routine pull down box 1580. Additional routines are selected using the Add Other Routine boxes 1582, 1584. Additional routines may be added by pressing the Add button 1586. The routines are displayed in the routine table 1590. Each routine in the routine table 1590 may be removed by pressing the delete button 1592. Once the routines are selected, the new algorithm is added by pressing the Save button 1595.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the appended claims.

APPENDIX

| | |
|---|---|
| Lehmer101 | $X1 = [(P1 * Xo) + P2] \text{MOD}(N)$<br>$Xn = [(P1 * Xn - 1) + P2] \text{MOD}(N)$, for $Xn > 1$<br>$\{P1, P2, N, Xo\}$<br>Example: $\{16807, 77, 2147483647, 999\}$<br>16790270, 873710210, 2101805008,<br>1078260030, 1849310901 ... |
| Sinnran102 | $X1 = [(P1 * Xo + P2] \text{MOD}(N)$<br>$Xn = [(P1 * Xn - 1) + P2] \text{MOD}(N)$ for $Xn > 1$<br>$Z1 = [X1 + Xo] \text{MOD}(M)$<br>$Zn = [Xn + Xn - 1] \text{MOD}(M)$ for $Xn > 1$<br>$\{P1, P2, N, M, Xo\}$<br>Example: $\{7879, 77, 9851477, 256, 109\}$<br>117, 199, 75, 155, 25, 93, 104, 27, 224, 249, 138 ... |
| Sinnran 103 | $X1 = [(P1 * Xo) + P2] \text{MOD}(N)$<br>$Xn = [(P1 * Xn - 1) + P2] \text{MOD}(N)$ for $Xn > 1$<br>$Z1 = (X1 + Xo)\text{MOD}(M)$<br>$Zn = (Xn + Zn - 1)\text{MOD}(M)$ for $Xn > 1$<br>$Zn = \{\text{SumXi}\}\text{MOD}(M), i = 0$ to $n$<br>$\{P1, P2, N, M, Xo\}$<br>Example: $\{7879, 77, 9851477, 256, 77\}$<br>117, 209, 198, 188, 80, 139, 46, 43, 244, 119, 10 ... |
| Sinnran 104 | $X1 = [(P1 * Xo) + P2] \text{MOD}(N)$<br>$Xn = [(P1 * Xn - 1) + P2] \text{MOD}(N)$ for $Xn > 1$<br>$Z1 = \{\text{INT}[\text{Log2}(P1 * Xo + P2)] + X1\}\text{MOD}(M)$<br>$Zn = \{\text{INT}[\text{Log2}((P1 * Xn - 1 + P2)] + Xn\}$<br>$\text{MOD}(M)$ for $Xn > 1$<br>$\{P1, P2, N, M, Xo\}$<br>Example: $\{7879, 77, 9851477, 256, 2\}$<br>59, 124, 23, 20, 183, 94, 198, 30, 237, 164, 182, 158, 53 ... |
| Sinnran 105 | $X1 = [(P1 * Xo) + P2] \text{MOD}(N)$<br>$Xn = [(P1 * Xn - 1) + P2]$<br>$\text{MOD}(N)$ for $Xn > 1$<br>$Z1 = \{\text{INT}[\text{Log3}(P1 * Xo + P2)] + X1\}\text{MOD}(M)$<br>$Zn = \{\text{INT}[\text{Log3}((P1 * Xn - 1 + P2)] + Xn\}$<br>$\text{MOD}(M)$ for $Xn > 1$<br>$\{P1, P2, N, M, Xo\}$<br>Example: $\{7879, 77, 9851477, 256, 2\}$<br>52, 112, 10, 9, 170, 81, 185, 17, 223, 151, 169, 146, 40, 153 .. |
| Sinnran 106 | $X1 = [(131 * Xo) + P2] \text{MOD}(N)$<br>$Xn = [(P1 * Xn - 1) + P2]$<br>$\text{MOD}(N)$ for $Xn > 1$<br>$Z1 = \{\text{INT}[\text{Log4}(P1 * Xo + P2)] + X1\}\text{MOD}(M)$<br>$Zn = \{\text{INT}[\text{Log4}((P1 * Xn - 1 + P2)] + Xn\}$<br>$\text{MOD}(M)$ for $Xn > 1$<br>$\{P1, P2, N, M, Xo\}$<br>Example:<br>49, 108, 6, 5, 165, 76, 180, 13, 180, 13,<br>219, 147, 164, 142, 35, 148 ... |

We claim:

1. A method of encrypting a plain text message that is m characters in length, the method comprising:
generating a one off random key having a length of m characters, the random key using a character set and modulus that is compatible with the plain text message;
performing a first substitution encryption of the plain text message using the generated random key;
generating a string of random fill characters that is f characters in length, f being a number from zero to infinity;
concatenating the generated random key and the string of random fill characters to the encrypted plain text message to generate an encrypted message string, wherein the encrypted message string has a length 2m+f;
performing one or more additional encryptions, selected from the set of substitution encryptions and transposition encryptions, on the encrypted message string to generate a final message string, wherein at least one of the one or more additional encryptions are performed using a first pseudorandom string having a length greater than 2m+f characters, and a subset of the first pseudorandom string having a length of at least 2m+f is selected from a position that is different from a first position of the first pseudorandom string; and
transmitting the final message string to a receiver.

2. The method of claim 1, wherein one or more second pseudorandom strings are used for the remaining ones of the one or more additional encryptions, each of the one or more second pseudorandom strings having a length of at least 2m+f characters.

3. The method of claim 2, wherein at least one of the one or more second pseudorandom strings has a length greater than 2m+f, and a subset of the second pseudorandom string having a length of at least 2m+f is selected from a position that is different from a first position of the second pseudorandom string, and wherein the selected subset is applied to the encrypted message string to perform at least one of the additional encryptions.

4. The method of claim 1, wherein a first additional encryption of the one or more additional encryptions is a second substitution encryption performed by applying the first pseudorandom string to the encrypted message string.

5. The method of claim 1, wherein at least one of the additional encryptions is a transposition encryption performed by sorting the first pseudorandom string against the encrypted message string.

6. A method of encrypting a plain text message that is m characters in length, including any end of message characters, the method comprising:
receiving a setting of two or more parameters, the parameters including a block size b and a plain text segment size p, wherein b is equal to or greater than 2*p;
dividing the plain text message into n segments, n being an integer greater than or equal to two, each segment associated with one of n blocks, n being equal to m/p if there is no remainder and equal to the integer quotient+1 if there is a remainder r, wherein in the case where there is a remainder, the last block of the n blocks contains the last r characters of the m character message, and wherein each of the blocks contains a sequential segment of the plain text message;
generating, for each of the n blocks, one-off strings of random characters, using a character set and modulus that is compatible with the plain text message;
performing a first substitution encryption on each of the n segments using characters from the random string associated with the block associated with the respective segment as an encryption key;
performing one or more additional encryptions, selected from the set of substitution encryptions and transposition encryptions on each of the n segments to create encrypted character strings, wherein at least one of the one or more additional encryptions are performed using a first pseudorandom string having a length greater than 2*p characters, and a subset of the first pseudorandom string having a length of at least 2*p is selected from a position that is different from a first position of the first pseudorandom string;

generating an encrypted message string by concatenating the encrypted character strings of the n blocks such that the encrypted message string is at least 2m characters in length; and transmitting the encrypted message string to a receiver.

7. The method of claim 6, further comprising concatenating an additional block of random characters to the encrypted message string prior to transmitting, the block having a random length from 0 to (b−1) characters.

8. The method of claim 7 further comprising:
providing a computer application for allowing a user to (i) change any of the two or more parameters, and (ii) generate a master key for each new set of parameters which may be sent to other users for use in decrypting the encrypted message string.

9. A method of encrypting a plain text message that is m characters in length, including any end of message characters, the method comprising:
dividing the plain text message into n segments, n being an integer greater than or equal to two, wherein each segment is associated with one of n blocks;
generating one off random strings for each of the n blocks, each random string having a length of at least the length of the plain text segment associated with that block, each of the random strings using a character set and modulus that is compatible with the plain text message;
performing a first substitution encryption on each of the n plain text segments using characters from the random string associated with the block associated with the respective plain text segment as an encryption key;
performing one or more additional encryptions, selected from the set of substitution encryptions and transposition encryptions on each of the n segments to create encrypted character strings, wherein at least one of the one or more additional encryptions are performed using a first pseudorandom string having a length greater than 2*(m/n) characters, and a subset of the first pseudorandom string having a length of at least 2*(m/n) is selected from a position that is different from a first position of the first pseudorandom string;
generating an encrypted message string by concatenating the encrypted character strings of the n blocks such that the encrypted message string is at least 2m characters in length; and
transmitting the encrypted message string to a receiver.

10. An encryption system comprising an algorithm and a plurality of parameter sets, wherein the encryption system produces an encrypted message from a plain text message having m characters by performing (i) a first substitution encryption of the plain text message with a one off random string, and (ii) one or more additional encryptions on the output of the first substitution encryption, the one or more additional encryptions determined by a selected one of the plurality of parameter sets, wherein at least one of the one or more additional encryptions are performed using a first pseudorandom string having a length greater than m characters, and a subset of the first pseudorandom string having a length of at least m is selected from a position that is different from a first position of the first pseudorandom string, the encrypted message containing all of the information needed to decrypt the encrypted message by a decryption system having the same parameter set, wherein the probability of subsequent encryptions of the same plain text message producing a different encrypted message depends on the parameter set used by the encryption system.

11. The encryption system of claim 10, wherein the parameter set is selected by a user.

12. An encryption method comprising:
receiving a plain text message;
segmenting the plain text message into a plurality of blocks, each block holding a predefined plurality of characters of the plain text message;
generating a unique one off random key for each of the plurality of blocks;
encrypting each of the plurality of blocks using the corresponding one off random key; and
performing one or more additional encryptions on each of the blocks using pseudorandom strings, each of the one or more additional encryptions being selected from the set of substitution encryptions and transposition encryptions, wherein at least one of the one or more additional encryptions are performed using a first pseudorandom string having a length greater than the number of characters in each of the plurality of blocks, and a subset of the first pseudorandom string having a length of at least the number of characters in each of the plurality of blocks is selected from a position that is different from a first position of the first pseudorandom string.

13. The encryption method of claim 12, further comprising:
providing a computer application for allowing a user to select an algorithm used for generating the pseudorandom strings.

14. The encryption method of claim 13, wherein the computer application includes a library of pseudorandom generators and the computer application is configured to allow the user to generate new algorithms using pseudorandom generators chosen from the library of pseudorandom generators.

15. The encryption method of claim 12, wherein each of the encrypted plurality of blocks includes the encrypted segment of the plain text message and one of the generated one off random keys, such that the one off random key in each block is not the one off random key which was used to encrypt the plain text in that block.

16. The encryption method of claim 12 further comprising:
providing a computer application for allowing a user to generate an algorithm profile, wherein the algorithm profile may be sent to other users for use in decrypting an encrypted message.

* * * * *